(12) United States Patent
Wilson et al.

(10) Patent No.: US 8,608,089 B2
(45) Date of Patent: Dec. 17, 2013

(54) NOZZLE FOR USE IN FLUIDIZED CATALYTIC CRACKING

(75) Inventors: Joseph W. Wilson, Naperville, IL (US); Jeffrey S. Smith, Aurora, IL (US); Derek Colman, Fleet (GB)

(73) Assignee: BP Corporation North America Inc., Houston, TX (US)

( * ) Notice: Subject to any disclaimer, the term of this patent is extended or adjusted under 35 U.S.C. 154(b) by 131 days.

(21) Appl. No.: 12/960,606

(22) Filed: Dec. 6, 2010

(65) Prior Publication Data

US 2012/0138698 A1 Jun. 7, 2012

(51) Int. Cl.
*B05B 17/04* (2006.01)

(52) U.S. Cl.
USPC ............................. 239/11; 239/599; 239/601

(58) Field of Classification Search
USPC ................. 239/601, 1, 11, 597–599
See application file for complete search history.

(56) References Cited

U.S. PATENT DOCUMENTS

| | | | |
|---|---|---|---|
| 3,288,377 A | 11/1966 | Van de Roer | |
| 3,303,103 A | 2/1967 | Schmidt et al, | |
| 3,687,375 A | 8/1972 | Griffiths | |
| 4,711,766 A | 12/1987 | Cartmell et al. | |
| 4,793,913 A | 12/1988 | Chessmore et al. | |
| 4,808,382 A | 2/1989 | Cartmell et al. | |
| 4,875,996 A | 10/1989 | Hsieh et al. | |
| 5,306,418 A | 4/1994 | Dou et al. | |
| 5,673,859 A | 10/1997 | Haruch | |
| 5,775,446 A * | 7/1998 | Lott | 175/424 |
| 5,921,472 A | 7/1999 | Haruch | |
| 5,948,241 A | 9/1999 | Owen | |
| 5,979,799 A | 11/1999 | Chen et al. | |

(Continued)

FOREIGN PATENT DOCUMENTS

| | | |
|---|---|---|
| GB | 2 003 047 | 3/1979 |
| WO | WO 2006/023071 | 3/2006 |

OTHER PUBLICATIONS

International Search Report and Written Opinion of the International Application No. PCT/US2011/061814, mailed May 3, 2012.
Engineer's Guide to Spray Technology, pp. 1-15, Spraying Systems Co., Wheaton, Illinois, U.S.A. (2000).

*Primary Examiner* — Christopher Kim
(74) *Attorney, Agent, or Firm* — Ekkehard Schoettle; Stepahanie J. Felicetty; Kelly L. Cummings

(57) ABSTRACT

Disclosed herein is a nozzle tip that atomizes a liquid entering a vessel or reaction zone that contains circulating fluidized particulates where the nozzle tip comprises a first elongated slot that intersects with a second elongated slot to define a single orifice. The first elongated slot may have members protruding into it and the slots may intersect substantially orthogonally and bisect each other. The length of the minor axis of the first slot ranges form about 5% to about 50% of the length of the major axis of the first slot and the length of the minor axis of the second slot ranges form about 1% to about 10 % or the major axis of the second slot. This nozzle tip affords erosion reduction caused by the circulating fluidized particulates and therefore provides longer operational lifetimes for the nozzle tip.

19 Claims, 4 Drawing Sheets

(56) References Cited

U.S. PATENT DOCUMENTS

| | | |
|---|---|---|
| 6,199,768 B1 | 3/2001 | Koveal et al. |
| 7,332,131 B2 | 2/2008 | Chen et al. |
| 7,407,572 B2 | 8/2008 | Steffens et al. |
| 7,793,859 B2 | 9/2010 | Kolb et al. |
| 2004/0195402 A1 | 10/2004 | Joshi |
| 2005/0173558 A1 | 8/2005 | Geertshuis et al. |
| 2006/0016726 A1 | 1/2006 | Steffens et al. |
| 2007/0246574 A1 | 10/2007 | Kolb et al. |
| 2007/0278328 A1 | 12/2007 | Bartolini et al. |
| 2008/0081006 A1 | 4/2008 | Myers et al. |

\* cited by examiner

NOZZLE FOR USE IN FLUIDIZED CATALYTIC CRACKING

BACKGROUND OF THE INVENTION

The present invention relates to an apparatus and process using an improved nozzle tip for atomizing a liquid stream, optionally together with a gas stream, and introducing the liquid together with the optional gas stream into a vessel where it contacts fluidized particles. In a specific embodiment the invention relates to introducing and atomizing a hydrocarbon feed into a riser reactor used in a fluidized catalytic cracking process.

In modern fluidized catalytic cracking the cracking reaction is effected by introducing the hydrocarbon feed at a lower or upstream, end of a riser reactor conversion zone together with hot fluidizable catalyst particulates. The hot catalyst supplies all or a major proportion of the heat to vaporize the feed and to carry out the endothermic cracking reaction.

The vaporized feedstock and catalyst pass up the riser reactor together at high superficial velocities. Because of the high activity of the catalyst, the cracking reaction has generally proceeded to the desired extent at the upper, or downstream, end of the riser reactor. The cracked hydrocarbons are then separated from the catalyst in a disengaging vessel and are sent downstream for further processing. The catalyst is, in turn, stripped with an inert gas such as steam to remove entrained hydrocarbons before being sent to a regenerating zone for removal of the coke which accumulates on the catalyst during the cracking process. The regenerated cracking catalyst is then introduced into the riser reactor.

Due to the extremely short contact times between the hydrocarbon feed and the fluidized catalyst particulates in the riser reactor, it is highly desirable to achieve immediate and intimate mixing of the hydrocarbon feed and catalyst particulates in order to achieve more uniform conversion of the hydrocarbon within the confines of the riser reactor conversion zone.

It is known that improved mixing reduces undesirable gas make, increases gasoline selectivity, improves the effect of catalytic cracking in preference to thermal cracking and reduces carbon formation.

Further, as refiners have perceived the need to blend heavier feeds, e.g., resids, with the typical fluidized catalytic cracking hydrocarbon feed due to economic incentives or supply constraints, the necessity of obtaining intimate and immediate mixing of catalyst particulates and hydrocarbon feed has become even more important. Specifically, heavier fractions of the heavier hydrocarbon feeds are not as readily vaporized in the riser reactor upon contact with the hot catalyst. Such non-vaporized components do not facilitate the desired intimate contact between catalyst particulates and feed. Liquid wetting of the catalyst particulates reduces the surface area available to catalyze the desired hydrocarbon reactions and results in increased coke formation due to adsorption of the heavy fractions present in the feed or by polymerization. Consequently the process duties of the catalyst stripper and regenerator are increased. Liquid droplets and wet catalyst particulates may also deleteriously deposit as coke on the walls of the riser reactor.

Accordingly, within the context of a short residence time fluidized catalytic cracking process, the feed injection system's ability to effect immediate and intimate mixing of catalyst particulates and hydrocarbon feed coupled with the rapid vaporization of the hydrocarbon feed is of paramount concern. The rate of hydrocarbon feed vaporization in the riser reactor is, of course, increased by increasing the degree of atomization of the hydrocarbon feed charged to the riser reactor.

In this connection it is known to use nozzles to atomize the hydrocarbon feed to the riser reactor. The feed nozzle performance determines the degree of atomization of the hydrocarbon feed which subsequently determines how well the feed mixes with the catalyst.

Generally, feed nozzle technology includes the use of an internal mixing zone for mixing liquid hydrocarbon and optionally an atomization medium gas such as steam followed by passing the mixture through a downstream nozzle tip designed to create small liquid hydrocarbon droplets from the hydrocarbon-steam mixture wherein these droplets can be distributed across the riser in a generally horizontal flat spray pattern. This flat spray pattern is achieved by injecting into the riser from a nozzle entering the riser in a side entry configuration. It is desirable that that the flat spray pattern be thin and uniform having a narrow distribution of fine droplets.

Certain nozzle tips comprise an elongated slot orifice to produce a flat fan spray pattern while other nozzle tips comprise two or more, i.e. multi-orifice designs. While the multi-orifice design provides enhanced atomization, these multi-orifice nozzle tips as well as elongated slot orifice tips are prone to erosion damage from increased erosion from the particulates. This erosion occurs because the jet of liquid and optionally gas passing through the nozzle tip creates a low pressure region near the periphery of the orifice opening and causes fluidized particles circulating in a vessel or reaction zone to flow to this periphery region and erode the nozzle tip. This erosion is more pronounced in multi-orifice nozzle tips. Premature or frequent replacement of nozzle tips in chemical plant or oil refinery units is a costly disadvantage to the operator.

Accordingly there is a need for a nozzle tip that provides greater atomization but mitigates the erosion characteristics associated nozzle tips especially with multi-orifice nozzle tips.

BRIEF SUMMARY OF THE INVENTION

The present invention relates to a nozzle tip for atomizing a spray of liquid feed wherein the nozzle tip comprises (a) a first elongated slot that optionally includes at least one member protruding inwardly from the perimeter of the first elongated slot; and (b) a second elongated slot that intersects with the first elongated slot, optionally in a substantially orthogonal configuration at a segment such that the major axis of the first elongated slot is bisected into about equal lengths and a single orifice is defined by the first elongated slot and the second elongated slot. In another embodiment of the present invention the length of the major axis of the first slot and the length of the major axis for the second slot are about equal.

In another embodiment, the present invention relates to a process for atomizing a liquid feed passing into a zone of a vessel that contains fluidized particles which comprises passing the liquid feed into a nozzle tip for atomizing the liquid feed wherein the nozzle tip comprises (a) a first elongated slot that optionally includes at least one member protruding inwardly from the perimeter of the first elongated slot; and (b) a second elongated slot that intersects with the first elongated slot, optionally substantially orthogonally, at a segment such that the major axis of the first elongated slot is bisected into about equal lengths and a single orifice is defined by the first elongated slot and the second elongated slot.

Further objects, features, and advantages of the present invention will become apparent from consideration of the following description and the appended claims when taken in connection with the accompanying drawings.

DETAILED DESCRIPTION OF THE INVENTION

Figure 1:
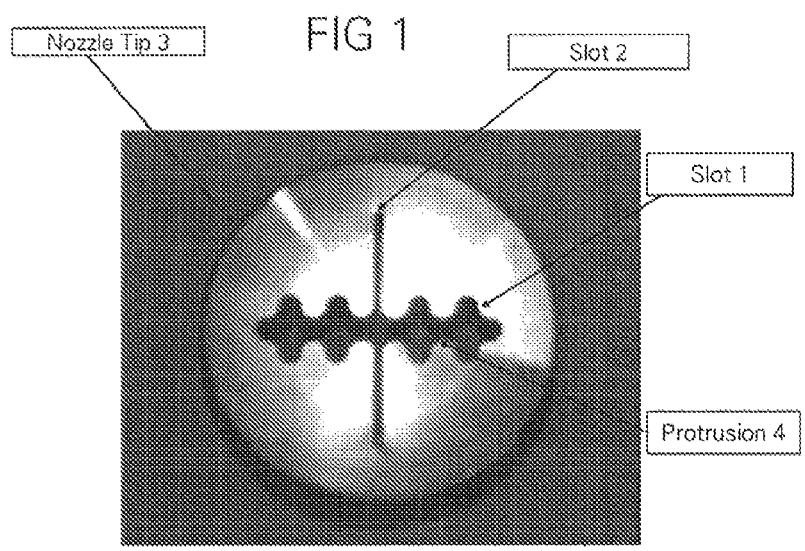
FIG. 1 is a schematic top view of the feed nozzle tip according to the present invention.

The present invention relates to an improved apparatus and process for atomizing a liquid and injecting or passing the atomized liquid into a vessel that contains fluidized particles. For instance the present invention can be used in the fluid coking process. In a fluid coking process a heavy hydrocarbon such as resid is sprayed into a fluidized bed of coke particles disposed in a vessel, Contact of the resid with hot fluidized coke particles forms volatile products such as naphtha, kerosene, heating oil and hydrocarbon gases which are passed overhead to a fractionator while the coke particles are removed from the bottom of the vessel In another embodiment, the present invention relates to an improved apparatus and process for carrying out the passing and atomization of a liquid hydrocarbon feed into a riser reactor situated in a fluidized catalytic cracking process. One of the problems associated with fluidized catalytic cracking in a riser reactor involves the short residence time in the riser reactor and the reactor's injection or feed system's inability to mix the cracking catalyst with the hydrocarbon feed rapidly and uniformly.

To facilitate such mixing hydrocarbon feed is ordinarily atomized by the use of a feed nozzle to inject hydrocarbon feed into the riser reaction zone in the fluidized catalytic cracking process. While achieving a high degree of atomization is desirable the nozzle must also provide a reasonable operational lifetime and not be subject to premature replacement due to erosion. In one attempt to prolong the life of nozzle tips, erosion-resistant materials such as STELLITE brand overlay material have been used as overlay at erosion sensitive areas of nozzle tips.

The nozzle tips useful in the present invention can be installed as a part of side entry nozzles that are positioned at the periphery of the vertical riser section at an elevated location or at the bottom of the riser reactor. Specifically, the nozzle may optionally protrude through the walls of the riser reactor for instance as used in a fluidized catalytic cracking process. The axial center line of the nozzle and the reactor may form an angle ranging from 90 to 25 degrees, it being appreciated that the orientation should not give rise to such an obtuse or acute angle such that the spray pattern is directed at the inside wall of the reactor. Nozzles also utilize various internal designs upstream of the nozzle tip to assist in the atomization process, e.g. swirl vanes, venturis and impingement devices. The use of and the type of internals used in a nozzle upstream of the nozzle tip of the present invention is not germane to the benefits and efficacy of the present invention. The nozzle, optionally protruding into the wall of the riser reactor, atomizes and directs the liquid into the reactor such that the spray pattern of the liquid contacts the fluidized particles circulating in the reactor, e.g. catalyst particles in the reactor. Multiple nozzles may be used in any one reactor.

A nozzle tip that provides both the requisite, desirable degree of atomization and a robust operational lifetime is afforded by the present invention. In one embodiment the hydrocarbon feed nozzle tip according to the present invention for atomizing a spray of liquid hydrocarbon feed comprises: (a) a first elongated slot that optionally includes at least one member protruding inwardly from the perimeter of the first elongated slot; and (b) a second elongated slot that intersects with the first elongated slot optionally substantially in an orthogonal configuration at a segment such that the major axis of the first elongated slot is bisected into about equal lengths and a single orifice is defined by the first elongated slot and the second elongated slot. Additionally, the intersection between the slots can be such that the second slot is also bisected into about equal lengths by the first slot. Further, in another embodiment the length of the major axis of the first slot and the major axis of the second slot are about equal.

The length of the major axis of either the first or second slot is defined as the longest continuous straight segment that connects two sides of the slot, e.g. the longest length from a side to another side in the case of a generally rectangular shaped slot. The length of the minor axis of either the first or second slot is defined as the shortest continuous straight segment that connects two sides of the slot, e.g. the width in the case of a generally rectangular shaped slot where the major axis defines the length of the rectangular shape. Where the first slot contains protrusions the minor axis is defined as the shortest continuous straight segment between the base of the protrusions protruding from two different opposite sides where this minor axis is generally orthogonal to the major axis.

Further, in accordance with the present invention the length of the minor axis of the first slot ranges from about five (5) % to about (50) % of the length of the major axis. In accordance with the present invention the length of the minor axis of the second slot ranges from one (1) % to about ten (10) % of the length of the major axis. As the length of the minor axis in either or both slots gets too large, i.e. beyond the range set forth in the prior sentence the orifice defined by the two slots generally starts to morph from a cross-like shape into a circular or square-like shape and acquires reduced atomization characteristics coupled with a spray pattern that will not be fan-like and engender increased nozzle tip erosion characteristics. Additionally as the minor axis of the first elongated slot gets greater, the thickness of the fan spray pattern increases such that the liquid hydrocarbon and catalyst are in contact for a longer time thereby detracting from the positive effects, i.e. short contact time, afforded by the flat fan pattern. If the minor axis of second elongated slot increases the spray pattern morphs into a vertical fan which would similarly result in an undesirable long time of contact with the fluidized catalyst particulates.

The first slot can have more than one protrusion which can be square edged, rectangular, pointed, semicircular or rounded shapes where the protrusions can occur in a sinusoidal, convex, semicircular or a saw toothed pattern. These protrusions should never come in contact with one another or be so large as to detract from the general flat fan spray pattern afforded by the nozzle tip. The protrusions are designed to provide more shear to the liquid passing through the orifice which in turn fosters better atomization.

Additionally, the nozzle tip of the present invention can include a first slot and a second slot that have the about the same length. Further, the first slot can intersect the second slot such that the major axis of the second slot in bisected into about equal lengths. The angle between the major axis of the first slot and the major axis of the second slot can range from about 45 Degrees to about 135 Degrees. A typical intersection angle will be about 90 degrees, i.e. the major axes will intersect substantially orthogonally.

Where the invention nozzle tip is used in the fluidized catalytic cracking process certain atomization medium gases can also be passed through the nozzle with the hydrocarbon feed to improve the atomization. The gases include steam, nitrogen, hydrogen fluidized catalytic process off-gas and lower molecular weight hydrocarbons, i.e. hydrocarbons having a carbon number of six or below. The weight ratio of atomization medium to hydrocarbon feed generally ranges from about 0.5 weight percent to about 5.0 weight percent.

The nozzle tips contemplated by the present invention can be fabricated by various means well known to those skilled in the art. The tips can be made of metal, ceramic or combinations thereof. The nozzle tip that contains the orifice can be generally flat, hemi-spherical or hemi-elliptical in shape. The spray pattern produced by the nozzle tip of the present invention will produce a flat or sheet type pattern.

FIG. 1 illustrates an embodiment of the nozzle tip of the present invention. Specifically nozzle tip 3 includes a first slot 1 which orthogonally intersects with a second slot 2 to form an orifice. First slot 1 contains a plurality of protrusions 4 that form a wavy or saw tooth like pattern where the shape of the protrusions 4 is generally semicircular. In this embodiment the length of the major axis of the first slot is 3.19 inches and the length of the minor axis of the first slot is 0.922 inches. The length of the second slot is 3.19 inches and the length of the minor axis of the second slot is 0.118 inches. The slots are each bisected into equal segments by the intersection of the major axes of the slots.

Figure 2:
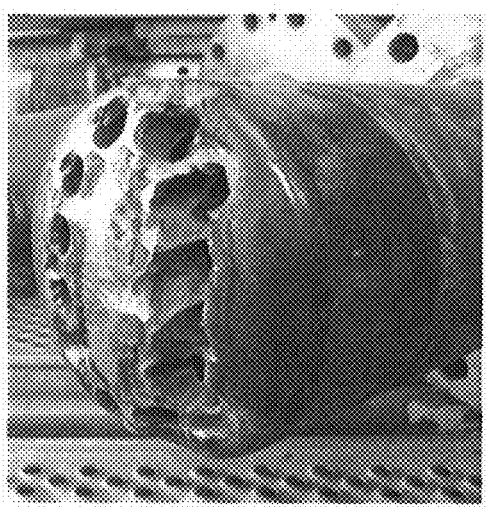
FIG. 2 is a photograph of an eroded prior art nozzle tip.

FIG. 2 shows a photograph of a prior art multi-orifice nozzle tip that has been severely eroded.

Figure 3:
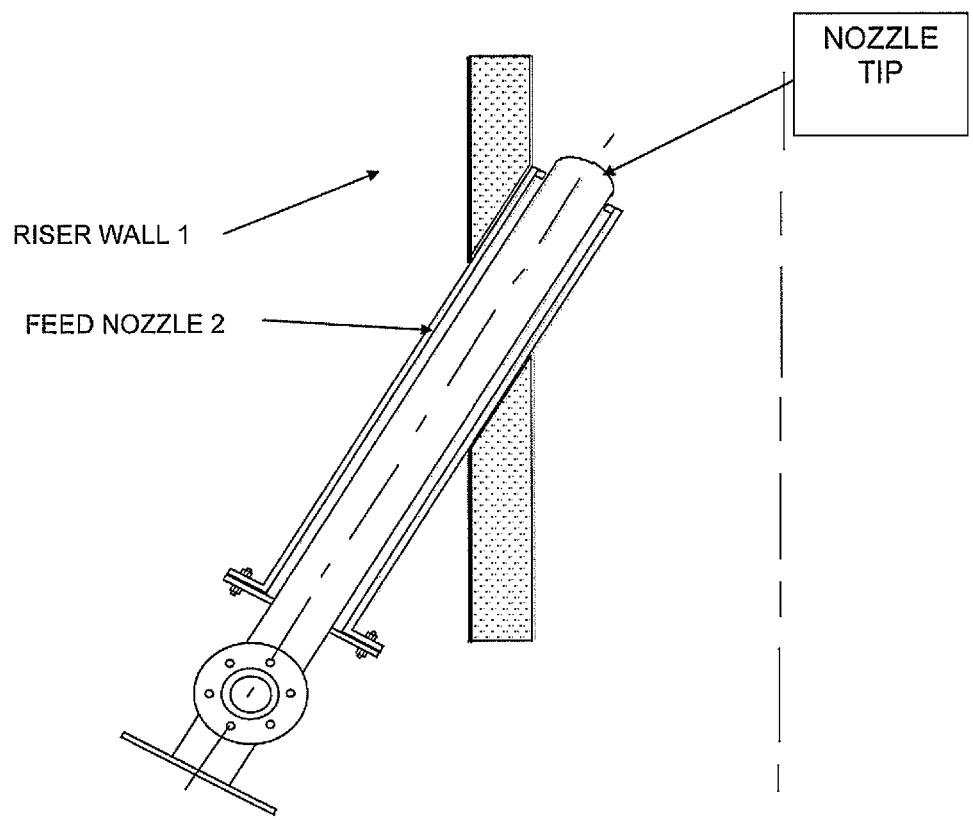
FIG. 3 depicts a nozzle and its juxtaposition and entry into a fluidized catalytic cracking unit as can be used in conjunction with the present invention.

FIG. 3 shows the nozzle arrangement amenable for use in the present invention wherein a fluidized catalytic cracking process is carried out. Specifically Feed Nozzle 2 protrudes into the Riser Wall 1. A nozzle tip in accordance with the present invention is deployed at Nozzle Tip 3 where the hydrocarbon feed is atomized and passed into the riser reactor containing circulating fluidized particles.

In another embodiment, the present invention provides for a process for atomizing a liquid feed passing into a zone containing circulating fluidized particles which comprises passing a liquid feed into a nozzle comprising a nozzle tip wherein the nozzle is in fluid communication with the inside of the zone and wherein the nozzle tip comprises a first elongated slot and a second elongated slot that intersects with the first elongated slot at an angle ranging from about 45 Degrees to about 135 Degrees between the major axes of the first elongated slot and the second elongated slot and at a segment such that the major axis of the first elongated slot is bisected into about equal lengths and a single orifice is defined by the first elongated slot and the second elongated. The process of the present invention also involves using a nozzle tip wherein the first slot of the nozzle tip includes at least one member protruding inwardly from the perimeter of the orifice. The process can include a configuration wherein the major axes of the slots intersect substantially orthogonally. Additionally, the process can include the use of the nozzle tip of the invention wherein the major axis of each slot has about the same length. In the process of the present invention the major axis of the second slot can be bisected into about equal lengths by the first slot. The process of the invention can be carried out where the length of the minor axis of the first slot ranges can range from about 5% to about 50% of the length of the major axis of the first slot and the length of the minor axis of the second slot can range from about 1% to about 10% of the length of the major axis of the second slot.

The process of the invention also comprehends the use of a nozzle tip where the first slot contains a plurality of inwardly facing protrusions wherein the shape of such protrusions is selected from the group consisting of square edged, rectangular edged, pointed, semicircular, or rounded shapes.

In yet another embodiment the process of the invention can be carried out with a nozzle tip wherein the first slot contains a plurality of inwardly facing protrusions wherein the shape of such protrusions is selected from the group consisting of square edged, rectangular edged, pointed, semicircular, or rounded shapes, the length of the minor axis of the first slot ranges from about 5% to about 50% of the length of the major axis of the first slot, wherein the length of the minor axis of the second slot ranges from about 1% to about 10% of the length of the major axis of the second slot, wherein the major axes of the slots intersect substantially orthogonally, the major axis of each slot has about the same length and the second slot is bisected into about equal lengths by the first slot.

The present invention is intended for use where any type of process liquid is atomized into a vessel or zone that has fluidizable particulates. As mentioned above fluid coking is a process amenable to the use of the present invention. When the invention is used in the fluidized catalytic cracking process the fluidizable particulates used in the invention constitute cracking catalyst, the cracking catalyst which is suitable in this invention includes high-activity solids having a size not greater than about 100 microns. Preferably, the major proportion of cracking catalyst is in the size range of about 40 to 80 microns. Suitable catalysts include those of the amorphous type such as silica, alumina, magnesia, boria, and mixtures thereof. The preferred catalysts include those comprising a molecular sieve component such as crystalline aluminosilicates or crystalline borosilicates.

The liquid that can be used with the nozzle tip of the present invention can include any heavy resides as are generally fed to a fluid coking process. Where the nozzle tip of the present invention is used in the fluidized catalytic cracking process the term "hydrocarbon feed" is intended to include petroleum fractions such as naphthas, distillates, gas oils, and residual oils; shale oils; oils from tar sands; oils from coal liquefaction; and the like and can include liquids derived from biomass feedstocks. This hydrocarbon feed can generally boil in the range of from about 221 Degrees C. to about 760 Degrees C.

The hydrocarbon feed and the cracking catalyst preferably pass up the riser reactor at cracking conditions, i.e., at a temperature of about 427 Degrees C. to about 593 Degrees C. (800 Degrees F. to 1100 Degrees F.); at a weight-hourly space velocity of about 2 to 200; at a catalyst-to-hydrocarbon weight ratio of about 2 to 20 so that the fluidized dispersion has a density of about 16 to 640 kg/m$^3$; and a fluidizing velocity of about 3 to 45 m/sec. Under these conditions the conversion level varies from about 40 to 100 percent where conversion is defined as the percentage reduction of hydrocarbons boiling above 221° C.

The foregoing description is given for clearness of understanding only, and no unnecessary limitations should be understood therefrom, as modifications within the scope of the disclosure may be apparent to those having ordinary skill in the art.

The following example is presented to illustrate the invention and should not be considered limiting in any way.

EXAMPLE

Computational fluid dynamics ("CFD") models using Navier-Stokes equations were used to model the flow through three nozzle tips. The software used for this CFD model was ANSYS FLUENT Flow Modeling Software available from Ansys, Inc. Generally the model inputs include the physical shape of the exterior surface of the nozzle tip, and the combined mass flow of steam and oil through the nozzle tip. In the present example the steam/oil mixture was modeled as one dense vapor rather than a two phase mixture.

Particulate solids inertia, i.e. the solids velocity squared times the solids volume fraction is a measure of local solids kinetic energy. It is believed that particulate solids inertia can be directionally linked to erosion potential in the applicable local area.

Figure 4:
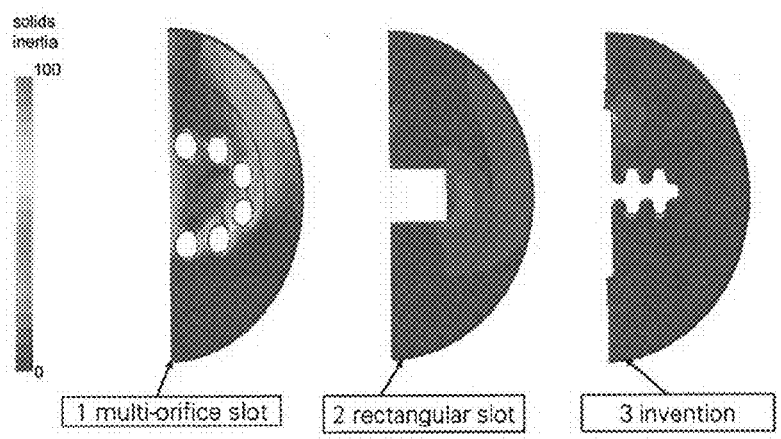
FIG. 4 depicts a view of corrosion profiles of various nozzle tips including the invention nozzle tip.

The results of the CFD model were then converted to visual data by commercially obtainable visualization software. FIG. 4 pictorially shows the results of the CFD modeling for various nozzle tips including the nozzle tip of the invention. More specifically the continuous color graph on the left shows the applicable solids inertia, ergo erosion potential, on a scale of 0 to 100 with 100 being the greatest inertia. As can be seen from an inspection of a plot of one half of the multi-orifice tip 1, substantial erosion regions or profiles occur around the periphery of the orifices as indicated by the colors showing relatively greater inertia. The rectangular slot nozzle tip also shows erosion contours around the periphery of the end of the slot. Invention nozzle tip 3 shows markedly reduced corrosion profiles as provided by the orifice design of the nozzle tip. It should be noted that the modeled flow rate for each nozzle tip depicted in FIG. 3 was the same and the overall orifice area for each tip was the same. Only one half of each nozzle tip was modeled in order to reduce the substantial computing time required by the FLUENT software.

What is claimed is:

1. A nozzle tip for atomizing a liquid feed passing into a zone that includes circulating fluidized particulates comprising:
   (a) a first elongated slot; and
   (b) a second elongated slot that intersects with the first elongated slot at an angle ranging from about 45 Degrees to about 135 Degrees between two major axes of the first elongated slot and the second elongated slot and at a segment such that the major axis of the first elongated slot is bisected into about equal lengths and a single orifice is defined by the first elongated slot and the second elongated slot;
   wherein the first elongated slot includes a plurality of members along each of two opposite sides parallel to the major axis of the first slot, on each side of the first slot bisected by the second elongated slot, the members protruding in a sinusoidal pattern along a perimeter of the first elongated slot.

2. The nozzle tip of claim 1 wherein the major axes of the slots intersect substantially orthogonally.

3. The nozzle tip of claim 1 wherein the major axis of each slot has about the same length.

4. The nozzle tip of claim 1 wherein the major axis of the second slot is bisected into about equal lengths by the first slot.

5. The nozzle tip of claim 1 wherein a length of a minor axis of the first slot ranges from about 5% to about 50% of a length of the major axis of the first slot and wherein a length of a minor axis of the second slot ranges from about 1% to about 10% of the a length of the major axis of the second slot.

6. The nozzle tip of claim 1 wherein the plurality of members protruding along a perimeter of the first elongated slot comprise a plurality of inwardly facing rounded protrusions.

7. The nozzle tip of claim 1 wherein the first slot is or elliptical in shape.

8. The nozzle tip of claim 1 wherein the second slot is rectangular or elliptical in shape.

9. The nozzle tip of claim 1 wherein a length of a minor axis of the first slot ranges from about 5% to about 50% of a length of the major axis of the first slot, wherein a length of a minor axis of the second slot ranges from about 1% to about 10% of a length of the major axis of the second slot, the major axes of the slots intersect substantially orthogonally, the major axis of each slot has about the same length and the second slot is bisected into about equal lengths by the first slot.

10. A process for atomizing a liquid feed passing into a zone containing circulating fluidized particles which comprises passing a liquid feed into a nozzle comprising a nozzle tip wherein the nozzle is in fluid communication with the inside of the zone and wherein the nozzle tip comprises the nozzle tip of claim 1.

11. The process of claim 10 wherein the liquid is a hydrocarbon feed and the zone is a riser reactor in a fluidized catalytic cracking process.

12. The process of claim 10 wherein the first slot of the nozzle tip includes at least one member protruding inwardly from the perimeter of the orifice.

13. The process of claim 10 wherein the major axes of the slots intersect substantially orthogonally.

14. The process of claim 10 wherein the major axis of each slot has about the same length.

15. The process of claim 10 wherein the major axis of the second slot is bisected into about equal lengths by the first slot.

16. The process of claim 10 wherein the length of the minor axis of the first slot ranges from about 5% to about 50% of the length of the major axis of the first slot and the length of the minor axis of the second slot ranges from about 1% to about 10% of the length of the major axis of the second slot.

17. The process of claim 10 wherein the first slot contains a plurality of inwardly facing protrusions wherein the shape of such protrusions is selected from the group consisting of square edged, rectangular edged, pointed, semicircular, or rounded shapes.

18. The process of claim 10 wherein the nozzle protrudes into the zone.

19. The process of claim 11 wherein first slot contains a plurality of inwardly facing protrusions wherein the shape of such protrusions is selected from the group consisting of square edged, rectangular edged, pointed, semicircular, or rounded shapes, the length of the minor axis of the first slot ranges from about 5.degree. A to about 50% of the length of the major axis of the first slot, wherein the length of the minor axis of the second slot ranges from about 1% to about 10% of the length of the major axis of the second slot, the major axes of the slots intersect substantially orthogonally, the major axis of each slot has about the same length and the second slot is bisected into about equal lengths by the first slot.

* * * * *